US008734247B2

(12) United States Patent
Hilbert et al.

(10) Patent No.: US 8,734,247 B2
(45) Date of Patent: May 27, 2014

(54) SYSTEMS, METHODS, AND APPARATUS FOR CONTROLLING A GAMING MACHINE DISPLAY

(75) Inventors: Scott T. Hilbert, Sparks, NV (US); Mark S. Ross, Las Vegas, NV (US)

(73) Assignee: IGT, Las Vegas, NV (US)

( * ) Notice: Subject to any disclaimer, the term of this patent is extended or adjusted under 35 U.S.C. 154(b) by 1522 days.

(21) Appl. No.: 12/124,264

(22) Filed: May 21, 2008

(65) Prior Publication Data

US 2009/0291757 A1 Nov. 26, 2009

(51) Int. Cl.
*A63F 13/00* (2006.01)

(52) U.S. Cl.
USPC .............................................. 463/31; 463/34

(58) Field of Classification Search
USPC .............................................. 463/30–31, 34
See application file for complete search history.

(56) References Cited

U.S. PATENT DOCUMENTS 5,029,982 A 7/1991 Nash
5,153,756 A 10/1992 Ike
5,406,305 A 4/1995 Shimomura et al.
5,952,992 A 9/1999 Helms
6,069,597 A 5/2000 Hansen
6,075,574 A 6/2000 Callway
6,135,884 A 10/2000 Hedrick et al.
6,812,649 B2 11/2004 Kim
7,121,944 B2 10/2006 Gauselmann
2002/0097978 A1 7/2002 Lowry et al.
2003/0144051 A1 7/2003 Gauselmann
2004/0223120 A1* 11/2004 Tan ................................ 353/30
2005/0128192 A1* 6/2005 Heintzman et al. ........... 345/207
2005/0212824 A1 9/2005 Marcinkiewicz et al.
2006/0040738 A1 2/2006 Okazaki et al.
2006/0088275 A1* 4/2006 O'Dea et al. .................... 386/46
2006/0194633 A1* 8/2006 Paulsen ........................... 463/43
2006/0211494 A1 9/2006 Helfer
2006/0223627 A1 10/2006 Nozaki et al.
2008/0254881 A1* 10/2008 Lutnick et al. .................. 463/31
2008/0276191 A1* 11/2008 Breed ........................... 715/771

OTHER PUBLICATIONS

International Search Report, PCT/US 2009/044697, dated Jul. 9, 2009, 3 pages.

* cited by examiner

*Primary Examiner* — Werner Garner
(74) *Attorney, Agent, or Firm* — Foley & Lardner LLP

(57) ABSTRACT

A gaming machine is provided including a display unit configured to generate video images, an input unit, an ambient light sensor, and a controller coupled to the display unit, input unit, and ambient light sensor. The controller is configured to receive physical characteristics of a player via the input unit, determine an ambient light level of an environment of the gaming machine based on a signal generated by the ambient light sensor, determine a desired brightness level for video images based on the determined ambient light level, determine a desired contrast level for the video images based on the received physical characteristics or the determined ambient light level, generate display settings for the video images based on the determined brightness level and the determined contrast level, and display the graphics to the player via the display unit using the generated display settings.

33 Claims, 8 Drawing Sheets

SYSTEMS, METHODS, AND APPARATUS FOR CONTROLLING A GAMING MACHINE DISPLAY

BACKGROUND OF THE INVENTION

The field of the disclosure relates generally to game playing methods for gaming machines, such as video slot machines and video poker machines, and, more particularly, to methods of customizing video image displays on gaming machines according to characteristics of a player and/or an environment.

As video technology advances, at least some known traditional mechanically-driven reel slot machines are being replaced with electronic machines that include electronic video displays, such as cathode ray tube (CRT) displays, liquid crystal displays (LCD), and/or other electronic display types. Moreover, play of video gaming machines, such as video slot machines and/or video poker machines, has become increasingly popular due in part to the large variety of games that may be implemented on gaming machines having the same or similar electronic components. In addition, at least some electronic gaming machines include computing architectures similar to those used in personal computers. Such architectures enable the gaming machines to operate increasingly complex games, including multiple displays and/or attraction sequences.

As gaming machines operate increasingly complex games, size constraints of the displays and/or cabinets containing the displays may cause objects and text to be displayed in a smaller size, and/or may limit the size of the display area itself. Research has indicated that a number of prospective players are over the age of 40, with more being substantially older still. As has been demonstrated through medical research, people over the age of 40 typically begin to see a noticeable degradation in their vision. For example, common aging effects relate to vision, such as presbyopia (lens hardening), senile miosis (reduced pupil size), and cornea and/or lens yellowing. Although corrective lenses may improve and compensate for some of such effects, corrective lenses generally are optimized at fixed focal distances that are unique to each individual. As such, each player may have a different perception of the playing field of the gaming machine display depending on a type, i.e., bifocal or trifocal, and/or corrective curvature of the corrective lens. As such, to fully visualize the same display areas different players may require different sized playing fields.

Moreover, at least some known gaming machine displays use fixed brightness and/or contrast values based on display manufacturer settings. Such settings are subjective and may have no relation to, for example, characteristics of the player or surrounding environmental conditions, such as the surrounding ambient light. As a result, graphics displayed on such gaming machine displays may appear less than optimal, which may compromise the player's experience. For example, in brighter ambient environments, depending on the brightness and contrast of the display, graphics displayed may be difficult to view, and may impair the player's visual perception. In contrast, in low ambient environments, depending on the brightness and contrast of the display, the graphics displayed may cause eye strain, and may thus reduce an amount of time the player enjoys or plays the game.

Further, at least some known gaming machine displays are set to use an increased brightness level and an increased contrast level to compensate for the lower retinal illumination of the majority of players. However, permanently increasing the brightness and contrast of such displays may negatively impact the lifespan of the displays.

Accordingly, it is desirable to provide game playing methodologies for gaming machines that maintain and increase playing interest and player comfort by adjusting a size of the game playing field, the brightness, and/or the contrast of the gaming machine display according to player characteristics and/or environmental characteristics.

BRIEF DESCRIPTION OF THE INVENTION

This Brief Description is provided to introduce a selection of concepts in a simplified form that are further described below in the Detailed Description. This Brief Description is not intended to identify key features or essential features of the claimed subject matter, nor is it intended to be used as an aid in determining the scope of the claimed subject matter.

In one aspect, a gaming machine is provided including a display unit configured to generate video images, an input unit configured to accept player input, an ambient light sensor configured to sense ambient light in an environment of the gaming machine and generate a signal representative of the sensed ambient light, and a controller coupled to the display unit, input unit, and ambient light sensor. The controller includes a processor and a memory, and is configured to receive physical characteristics of a player via the input unit, determine an ambient light level of an environment of the gaming machine based on the signal generated by the ambient light sensor, determine a desired brightness level for the video images to be displayed on the display unit based on the determined ambient light level, determine a desired contrast level for the video images based on at least one of the received physical characteristics and the determined ambient light level, generate display settings for the video images based on the determined brightness level and the determined contrast level, and display the graphics to the player via the display unit using the generated display settings.

In yet another aspect, a gaming system includes a server including a database configured to store player data and a plurality of gaming machines communicatively coupled to the server via a gaming network. Each gaming machine includes a display unit configured to generate video images for display to a player, an ambient light sensor configured to sense ambient light in an environment of each gaming machine and generate a signal representative of the sensed ambient light, and a controller coupled to the display unit and the ambient light sensor. The controller includes a processor and a memory, and is configured to receive physical characteristics of the player of each gaming machine, determine an ambient light level of an environment of each gaming machine based on the signal generated by the ambient light sensor, determine a desired brightness level for the video images to be displayed on the display unit based on the determined ambient light level, determine a desired contrast level for the video images based on at least one of the received physical characteristics and the determined ambient light level, generate display settings for the video images based on the determined brightness level and the determined contrast level, and display the graphics to the player via the display unit using the generated display settings.

In another aspect, a method is provided for adjusting display settings of a gaming machine. The method includes receiving physical characteristics of a player of the gaming machine, determining an ambient light level of an environment of the gaming machine, determining a desired brightness level for graphics to be displayed on the gaming machine based on the determined ambient light level, determining a desired contrast level for the graphics based on at least one of the received physical characteristics and the determined ambient light level, generating display settings for the graphics based on the determined brightness level and the determined contrast level, and displaying the graphics to the player using the generated display settings.

DETAILED DESCRIPTION OF THE INVENTION

Figure 1:
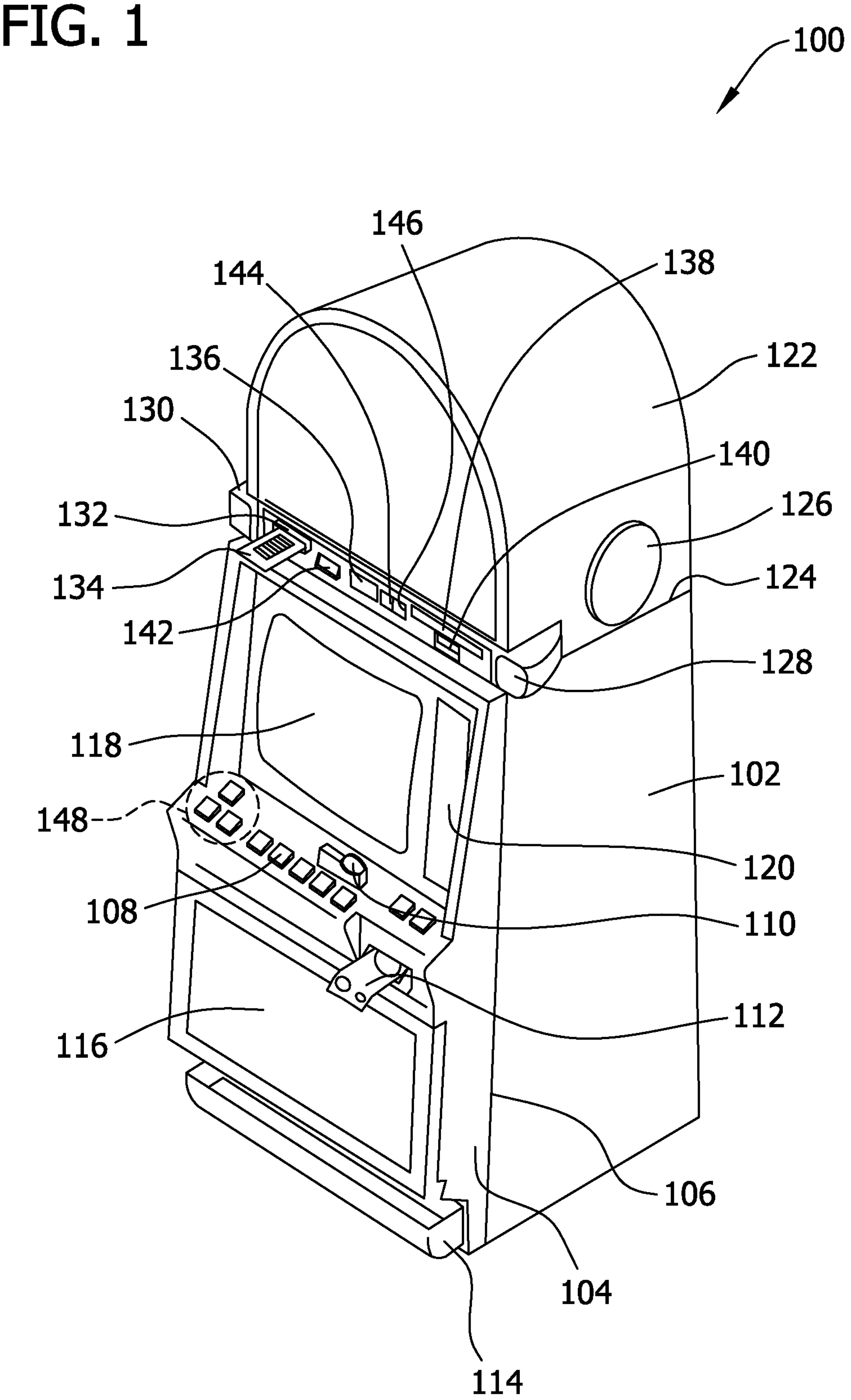
FIG. 1 is a schematic diagram of an exemplary gaming machine.

A computing device or computer such as described herein has one or more processors or processing units and a system memory. The computer typically has at least some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Aspects of the invention may be implemented with any number and organization of components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

FIG. 1 is a schematic diagram of an exemplary gaming machine 100 that includes a game playing field that may be adjusted based on player characteristics and/or environmental characteristics. Gaming machine 100 may be any type of gaming machine, and may include different structures than those shown in FIG. 1. Moreover, gaming machine 100 may employ different methods of operation than those described below.

In the exemplary embodiment, gaming machine 100 includes a main cabinet 102 having a main door 104 hingedly coupled to a front 106 of gaming machine 100. When opened, door 104 provides access to an interior of gaming machine 100. In the exemplary embodiment, a plurality of player-input switches and/or buttons 108 are coupled to main door 104. Moreover, in the exemplary embodiment, a coin acceptor 110, for accepting coins and/or tokens, a bill acceptor 112, for accepting and/or validating cash bills, a coin tray 114, for collecting a coin-based payout, and a belly glass 116 are each coupled to main door 104. A video display monitor 118 and an information panel 120 are viewable through main door 104. Video display monitor 118 may be implemented as a cathode ray tube (CRT), a flat-panel liquid crystal display (LCD), a plasma display, an organic light-emitting diode (OLED) display, or any other electronically-controlled video monitor. Moreover, video display monitor 118 may include touch screen capabilities. In the exemplary embodiment, information panel 120 is a back-lit, silk screened glass panel that includes lettering to indicate general game information including, for example, a number of coins wagered. Coin acceptor 110, bill acceptor 112, player-input buttons 108, video display monitor 118, and information panel 120 are each used by a player to play a game on gaming machine 100. Each component 108, 110, 112, 118, and/or 120 is controlled by a gaming machine controller (not shown in FIG. 1) that is housed inside main cabinet 102. Numerous games including, but not limited to only including, video slot games, video poker, video pachinko, video black jack, video card games, and/or video keno may be implemented for play on gaming machine 100.

In the exemplary embodiment, gaming machine 100 also includes a top box 122 that is positioned on a top surface 124 of main cabinet 102. In the exemplary embodiment, top box 122 includes a number of devices that may be used to add features to a game being played on gaming machine 100. Such devices may include, but are not limited to only including, speakers 126, 128, and 130, a ticket printer 132 for printing bar-coded tickets 134, a key pad 136 for entering player tracking information, or player preferences or characteristics, a fluorescent display 138 for displaying player tracking information and/or player preferences or characteristics, and a card reader 140 for receiving a magnetic striped card containing player tracking information and/or player preferences or characteristics encoded thereon. Card reader 140 may also be used to accept coupons, credit cards, printed cards, smart cards, and/or ticket vouchers. Moreover, top box 122 may house additional devices not shown in FIG. 1, such as, for example, a bonus wheel, a secondary video display, and/or a back-lit silk screened panel that may be used to add bonus features to a game being played on gaming machine 100. During game play, such devices may be controlled by circuitry, such as the gaming machine controller housed within main cabinet 102.

In the exemplary embodiment, top box 122 also includes a light sensing circuit (not shown in FIG. 1). The light sensing circuit includes a visible light sensor 142 used to automatically sense an ambient level of visible light in an environment or installation location of gaming machine 100. The light sensing circuit, in the exemplary embodiment, also includes an infrared (IR) light emitter 144 and an infrared light sensor 146, that are used in combination to detect the presence of a player standing or sitting at gaming machine 100. For example, in the exemplary embodiment, IR emitter 144 emits IR light that is targeted from video display monitor 118 a distance towards a location at which a player may be positioned. Typically, the target distance is approximately 30.0 inches (76.2 centimeters). In alternative embodiments, the target distance may be longer than, or shorter than, approximately 30.0 inches. IR sensor 146 senses any IR light that is emitted by IR emitter 144 and that is rejected by a player sitting or standing at gaming, machine 100. Moreover, in the exemplary embodiment, gaming machine 100 includes one or more video property adjustment buttons 148 that enable a player to selectively adjust display properties of video display monitor 118. For example, a player may selectively adjust a brightness level, a contrast level, and/or an overall size of a playing field of a game being displayed on video display monitor 118 in order to maximize the player's comfort level.

Figure 2:
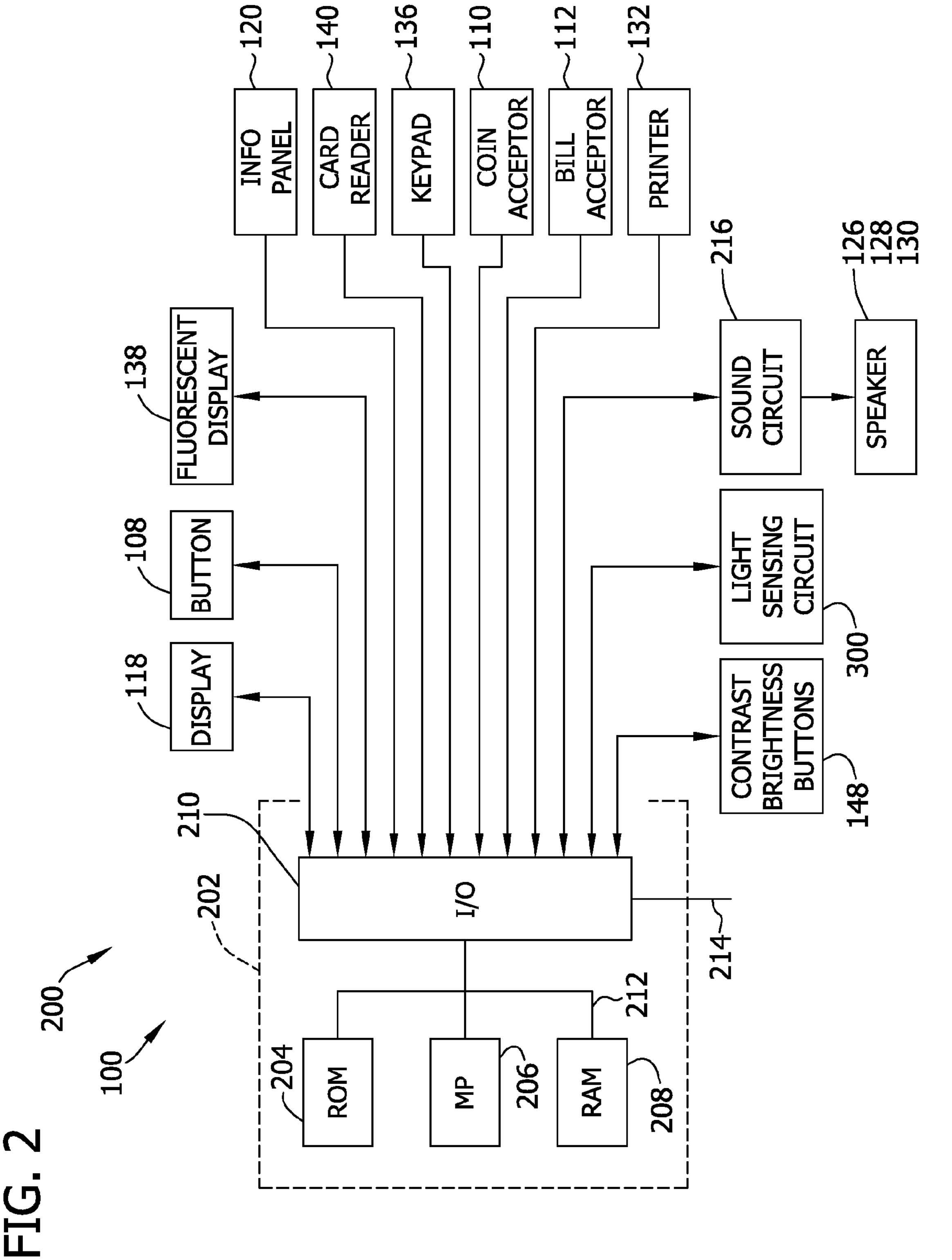
FIG. 2 is a block circuit diagram of an electrical architecture that may be used with the gaming machine shown in FIG. 1.

FIG. 2 is a block circuit diagram of an exemplary electrical architecture 200 incorporated into an exemplary gaming machine, such as gaming machine 100. In the exemplary embodiment, gaming machine 100 includes a gaming machine controller 202 that includes a read-only memory (ROM) 204, a microcontroller or microprocessor (MP) 206, a random-access memory (RAM) 208, and an input/output (I/O) circuit 210, each coupled via an address/data bus 212. As used herein, the terms "controller" and "processor" may include any programmable system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the terms "controller" or "processor". Alternative embodiments of controller 202 may include more than one microprocessor 206, multiple RAM modules 208, and/or multiple ROM modules 204. Moreover, although I/O circuit 210 is shown in FIG. 2 as a single component, one of ordinary skill in the art will appreciate that I/O circuit 210 may include any number or a plurality of different types of I/C circuits. Further, RAM 208 and/or ROM 204 may be implemented as, for example, semiconductor memories, magnetically readable memories, and/optically readable memories. In one embodiment, each operational component of gaming machine 100 is coupled to I/O circuit 210 via a respective conductor. Alternative embodiments may include a single coupling between the operational components of gaming machine 100 and I/O circuit 210. In the exemplary embodiment, I/O circuit 210 is coupled to a gaming network (not shown) via a network interface 214. Moreover, in the exemplary embodiment, architecture 200 includes a sound circuit 216 that generates audio signals and that communicates the audio signals between I/O circuit 210 and speakers 126, 128, and/or 130. In the exemplary embodiment, architecture 200 also includes a light sensing circuit 300 that includes visible light sensor 142, IR emitter 144, and IR sensor 146 (each shown in FIG. 1).

Figure 3:
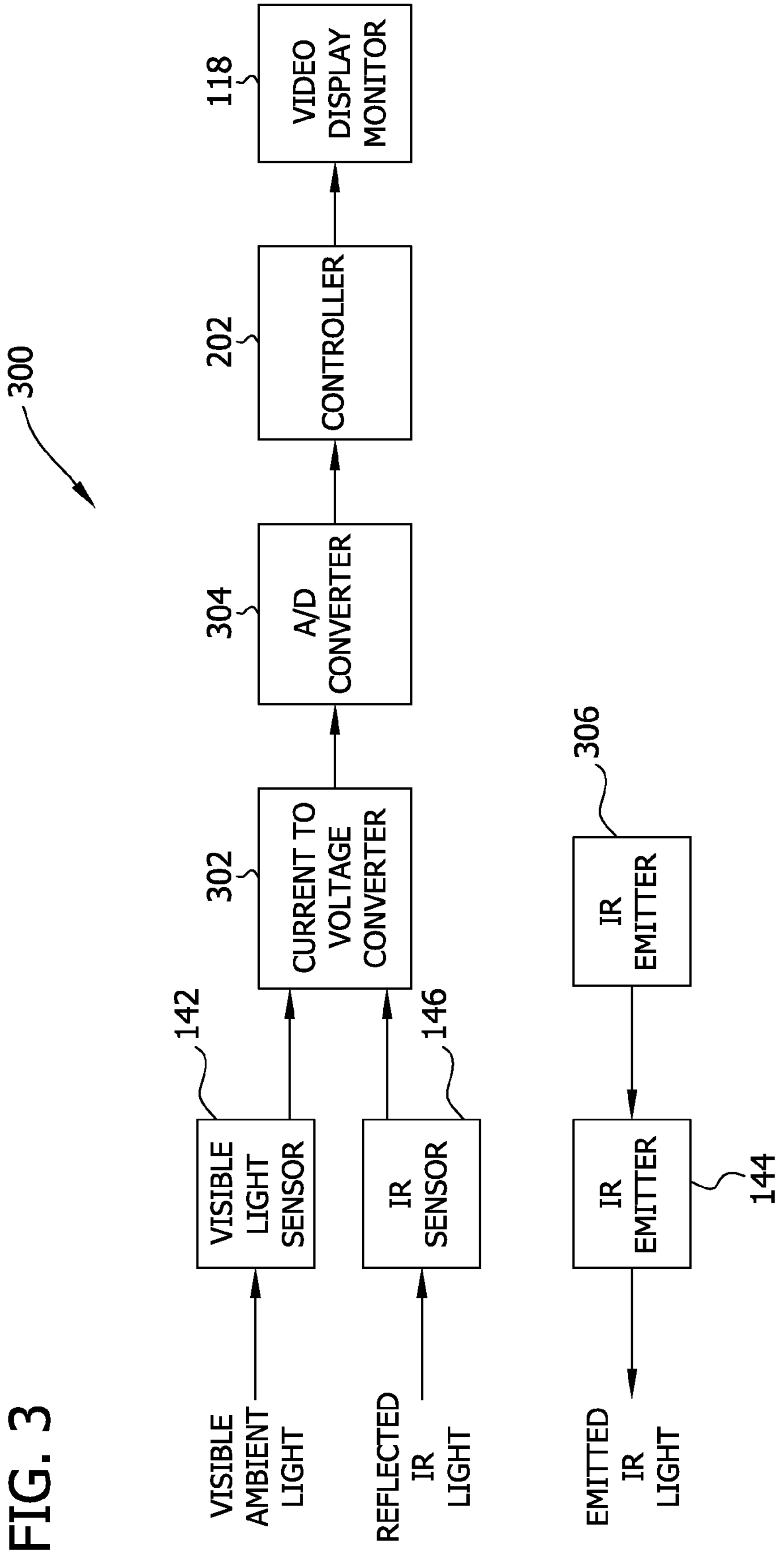
FIG. 3 is a block circuit diagram of an exemplary light sensing circuit that may be used with the electrical architecture shown in FIG. 2.

FIG. 3 is a block circuit diagram of an exemplary light sensing circuit, such as light sensing circuit 300. In the exemplary embodiment, circuit 300 includes visible light sensor 142. Visible light sensor 142 senses an ambient light level near video display monitor 118 of gaming machine 100 (both shown in FIG. 1). Specifically, in the exemplary embodiment, visible light sensor 142 is a photo-sensor that has a peak sensitivity to light with an approximately 550 nanometer (nm) wavelength. Such a wavelength substantially corresponds to a peak wavelength of human visual perception. Accordingly, in the exemplary embodiment, visible light sensor 142 does not sense light wavelengths outside the human visual spectrum, such that the potential for inaccurately or falsely setting display properties of video display monitor 118 is facilitated to be reduced. Visible light sensor 142 generates an electrical current that is proportional to the amount of ambient light to which visible light sensor 142 is exposed. The current is converted to a voltage by a voltage conversion unit 302 that is electrically coupled to visible light sensor 142. The voltage is then converted to a digital value by an analog-to-digital (A/D) converter 304 that is electrically coupled to voltage conversion unit 302. A/D converter 304 is also coupled to controller 202. A/D converter 304 transmits digital values to controller 202.

In an alternative embodiment, circuit 300 also includes IR emitter 144 and IR sensor 146. IR emitter 144 and IR sensor 146 are used to detect a player presence at gaming machine 100. Detecting a player presence may enable gaming machine 100 to activate lighting effects, suspend or initiate an attract mode, and/or enable other player specific effects. In the exemplary embodiment, IR emitter 144 is a narrow bandwidth light-emitting diode (LED) emitter that is amplitude ON-OFF modulated by an emitter driver 306 that is electrically coupled to IR emitter 144. As such, IR emitter 144 emits IR light to a targeted distance at which a player is normally positioned. When a player is present, the IR light is reflected off the player and the reflected IR light is sensed by IR sensor 146. IR sensor 146 generates an electrical current that is proportional to the presence of reflected IR light. The current is then converted to a voltage by voltage conversion unit 302. The voltage is then converted to a digital value by A/D converter 304 prior to being transmitted to controller 202.

Figure 4:
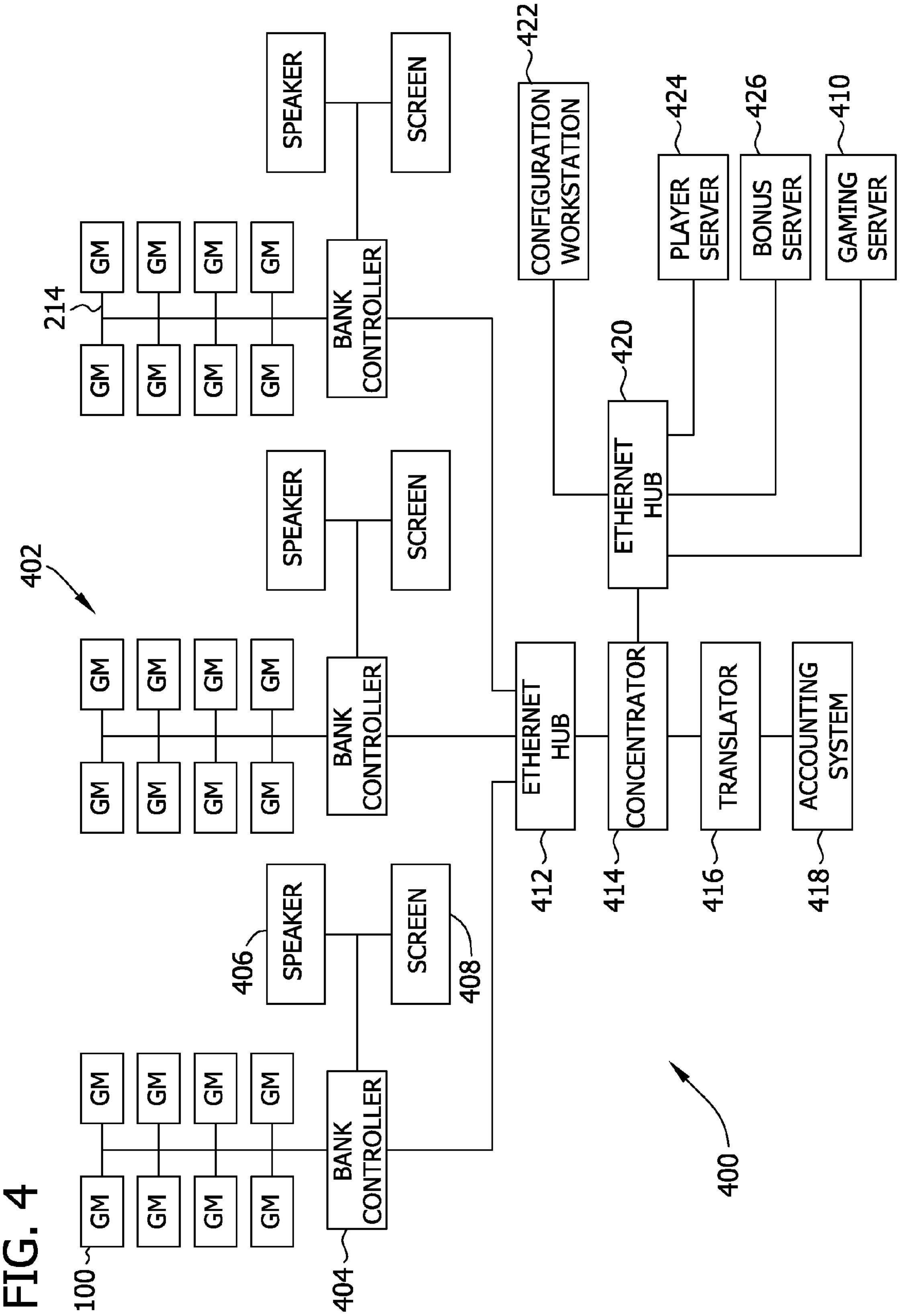
FIG. 4 is a block diagram of an exemplary gaming network.

FIG. 4 is a block diagram of an exemplary gaming network 400 that includes a plurality of gaming machines 100. Specifically, FIG. 4 shows three banks 402 of gaming machines 100. Each gaming machine 100 is coupled via a network connection 214 to a bank controller 404. In one embodiment, each bank controller 404 includes a processor (not shown) that facilitates data communication between each gaming machine 100 within each bank 402, and between each gaming machine 100 and other components of gaming network 400. In one embodiment, each bank controller 404 also includes audio capabilities, such as a CD-ROM drive (not shown) or DVD-ROM drive (not shown), that are coupled to a sound card (not shown) for processing and transmitting digitized sound effects to one or more speakers 406 in response to commands issued over gaming network 400 by bank controller 404. Each bank controller 404 is also coupled via gaming network 400 to an electronic sign or screen 408 that displays information, such as via scrolling and/or flashing messages that indicate, for example, jackpot amounts, and that are visible to players playing gaming machines 100. Messages for display on each electronic screen 408 are generated and/or modified in response to commands issued over gaining network 400 by bank controller 404.

As described above, gaming machines 100 may include video poker machines, video slot machines, and/or other similar gaming machines that implement alternative games. Moreover, gaming machines 100 may be terminal-based machines, wherein the actual games, including random number generation and/or outcome determination, are performed at a remote gaming server 410. In such an embodiment, gaming machine 100 displays results of the game played on gaming server 410 via video display monitor 118 (shown in FIG. 1).

A network connector, such as an Ethernet hub 412, couples each bank controller 404 to a concentrator 414. Concentrator 414 functions as a data control switch that routes data from each bank 402 to a translator 416. Translator 416 provides a compatibility buffer (not shown) between concentrator 414 and an accounting system 418. Moreover, translator 416 converts data gathered from each bank 402 into a format that is compatible with accounting system 418.

Another Ethernet hub 420 couples concentrator 414 to a configuration workstation 422, a player server 424, and to one or more bonus servers 426. Configuration workstation 422 includes a user interface that enables an administrator to set up and/or to modify portions of gaming network 400 and/or servers 410, 424, and 426. Player server 424 tracks data of players using gaming machines 100. Player server 424 also controls messages that appear on each video display monitor 118 and/or information panel 120 of gaming machines 100. In the exemplary embodiment, player server 424 also stores physical characteristics of players, such as the player age and/or vision data. Bonus server 426 controls bonus applications or bonus systems on gaming network 400. Bonus server 426 includes a set of rules for awarding jackpots in excess of those established by winning pay tables (not shown) of each gaming machine 100. Some bonus awards may be awarded randomly, while other bonus awards may be made to groups of gaming machines 100 operating in a progressive jackpot mode.

Figure 5:
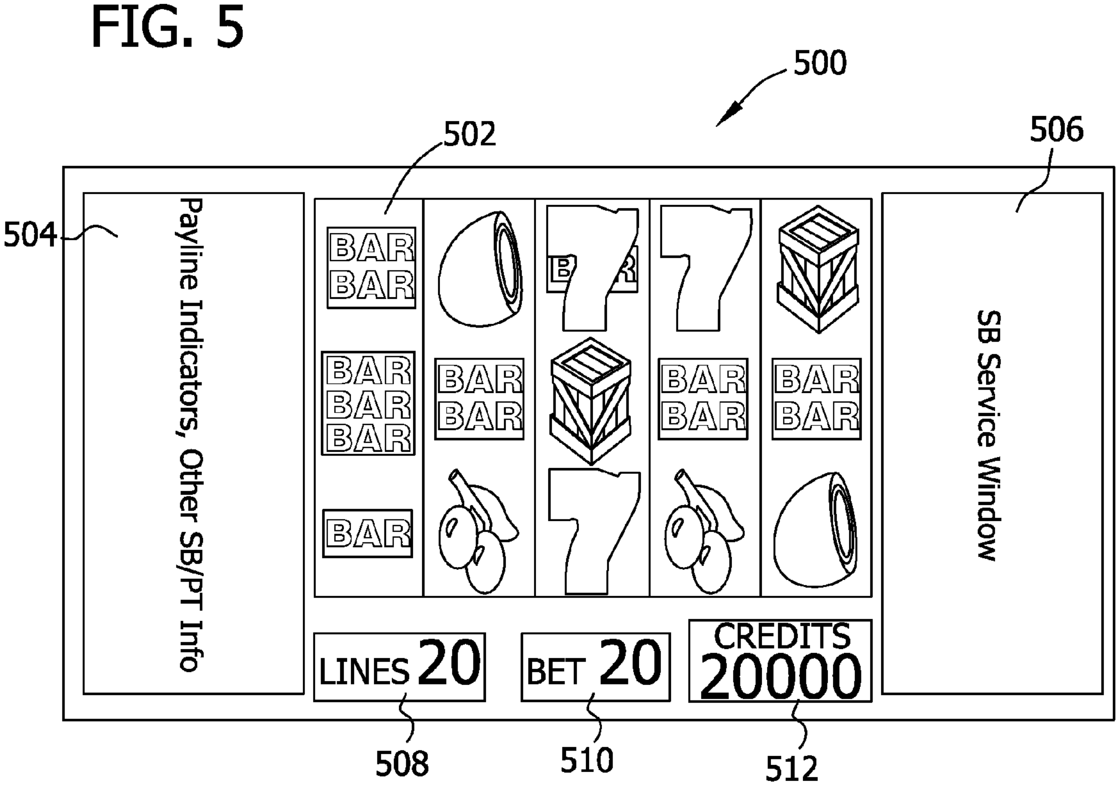
FIG. 5 is a view of a display of a video slots game having a typically sized playfield.
Figure 6:
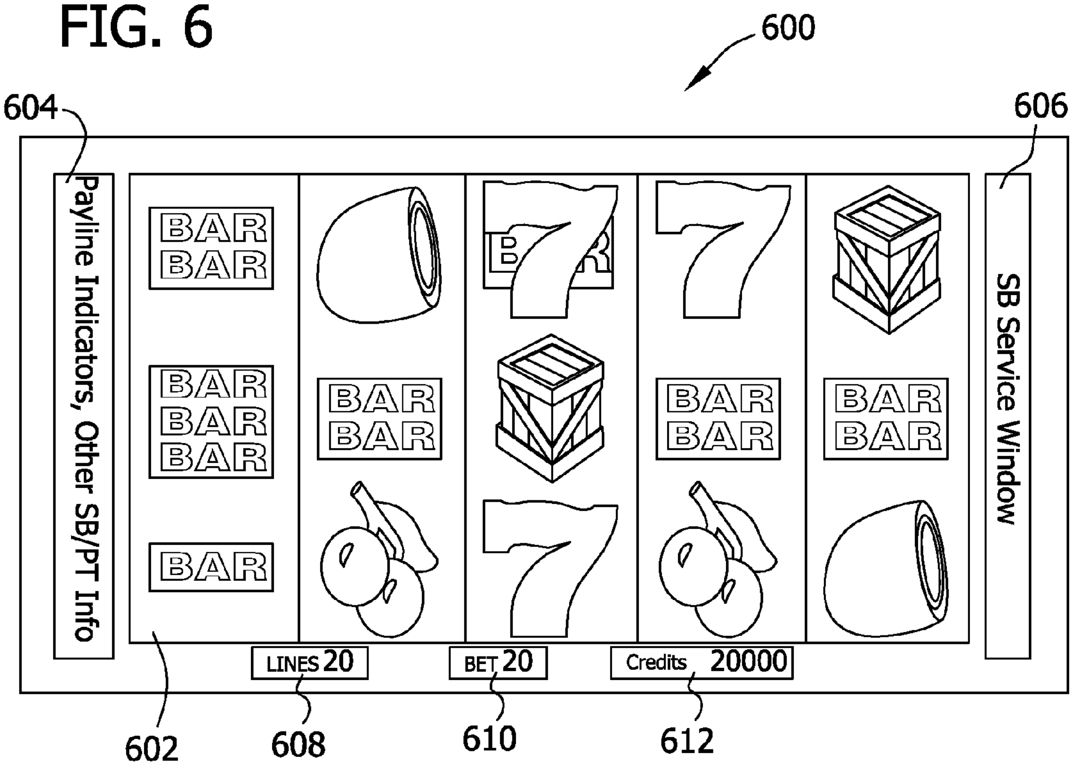
FIG. 6 is a view of a display of a video slots game having a re-sized playfield.
Figure 7:
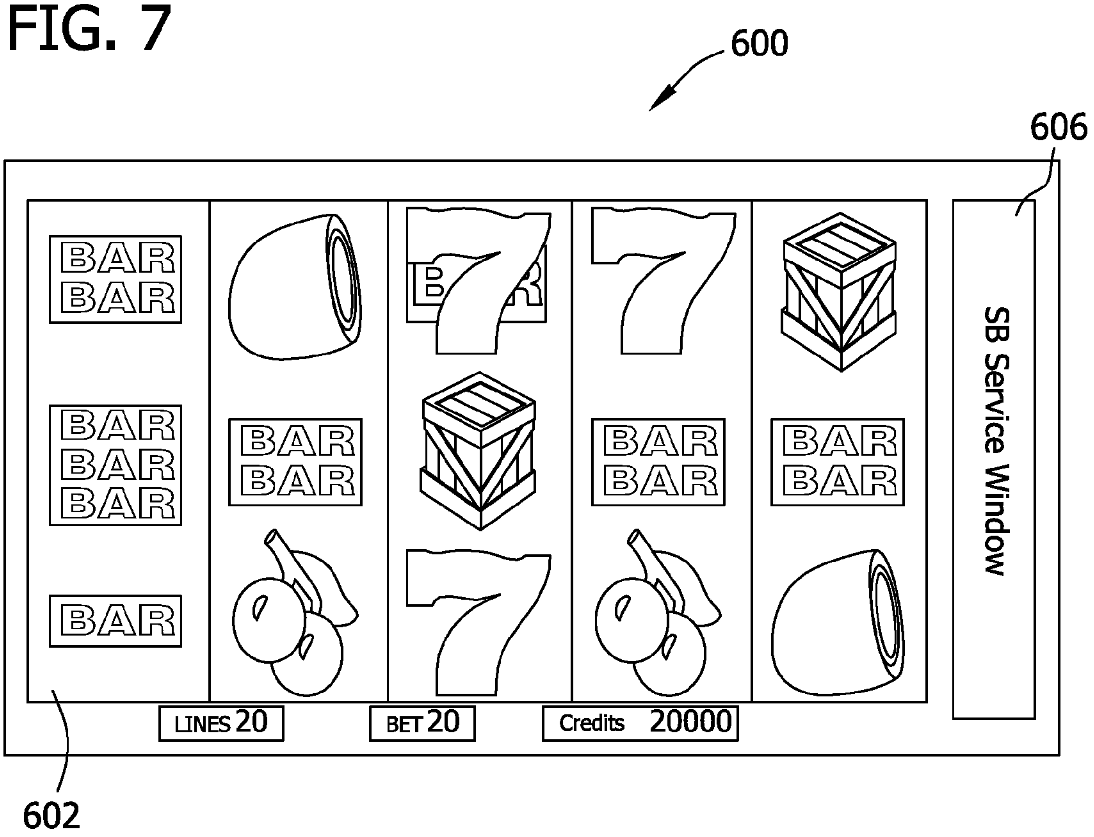
FIG. 7 is a second view of a display of a video slots game having a re-sized playfield.
Figure 8:
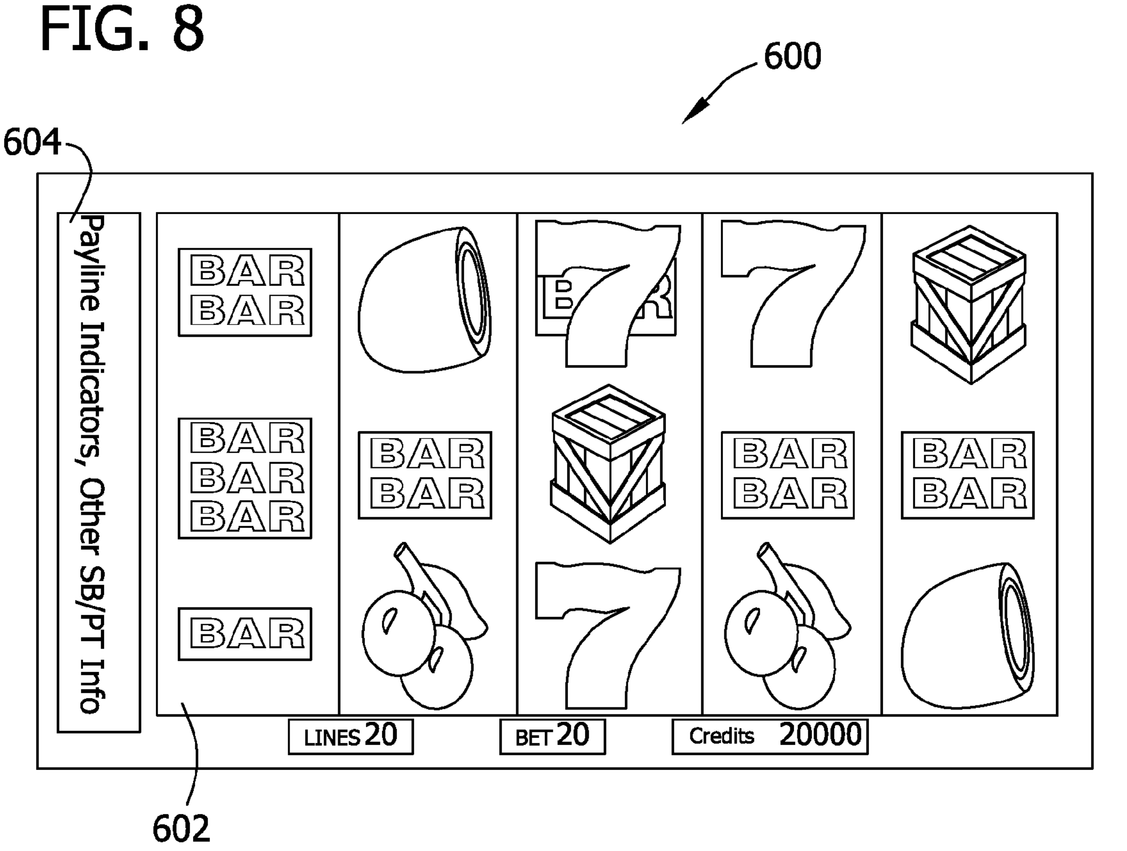
FIG. 8 is a third view of a display of a video slots game having a re-sized playfield.

FIGS. 5-8 are views of exemplary graphics that may be displayed on video display monitor 118 (shown in FIG. 1). Specifically, FIG. 5 is a view of an exemplary display 500 of a video slots game having a typically sized playfield 502. In the exemplary embodiment, display 500 includes playfield 502, a first sidebar 504, a second sidebar 506, a lines wagered field 508, a wager per line field 510, and an available credit field 512. FIG. 6-8 are exemplary views of a display 600 of a video slots game having a re-sized playfield 602. More specifically, display 600 has been adjusted to include a re-sized playfield 602, a re-sized first sidebar 604, a re-sized second sidebar 606, a re-sized lines wagered field 608, a re-sized wager per line field 610, and a re-sized available credit field 612. Although a video slots game is illustrated in FIGS. 5-8, it should be apparent that a playfield of any suitable game may be re-sized, such as, but not limited to, video poker, video pachinko, video black jack, video card games, and video keno.

Figure 9:
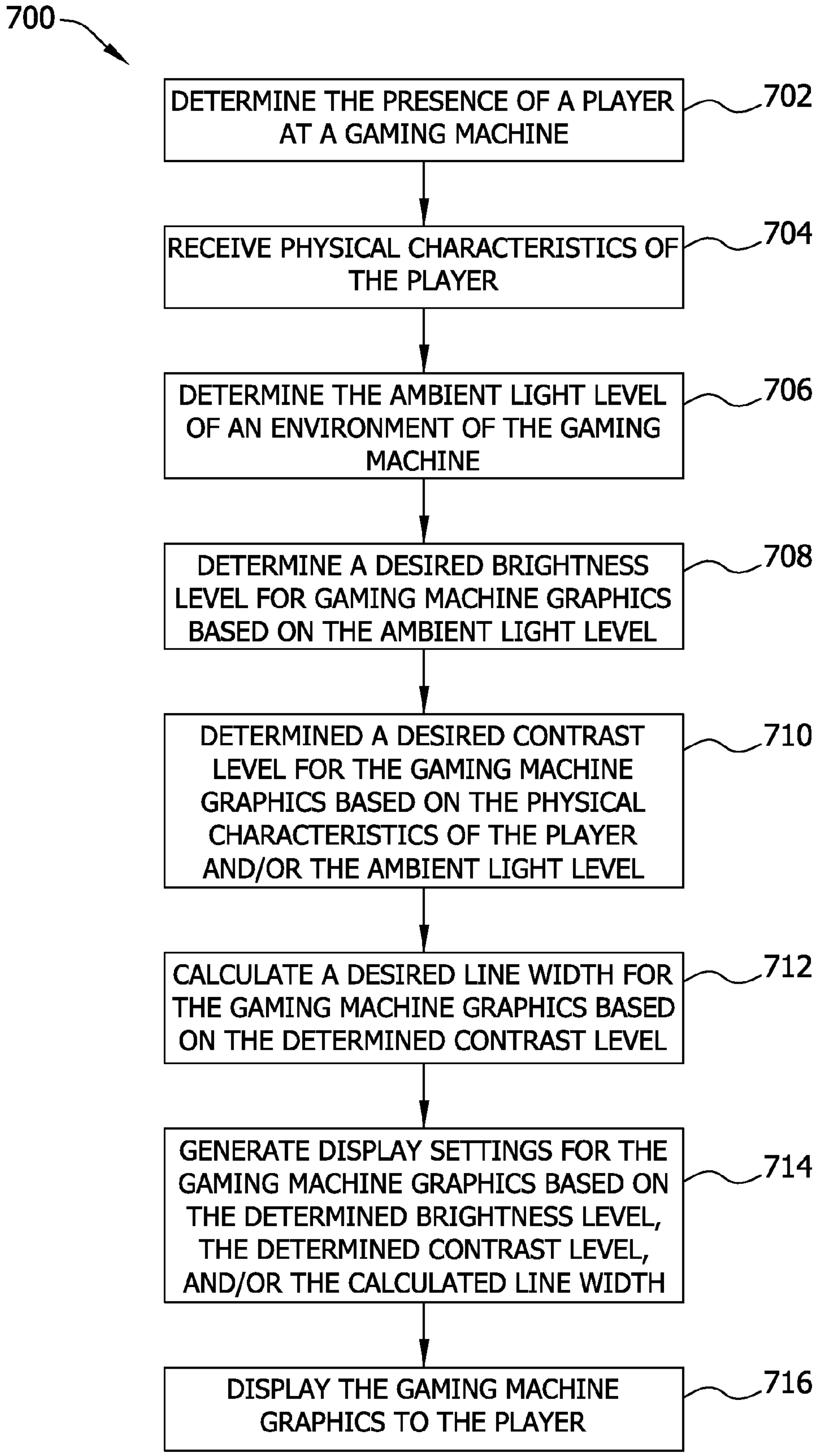
FIG. 9 is a flowchart illustrating an exemplary method for adjusting display settings of a gaming machine.

FIG. 9 is a flowchart illustrating an exemplary method 700 for adjusting the display settings of a gaming machine. Referring also to FIGS. 1-8, in the exemplary embodiment, gaming machine 100 initially determines 702 the presence of a player. When not in use gaming machine 100 may activate an attract sequence in an attempt to attract a player, using video display monitor 118 and/or speakers 126, 128, and/or 130. Attract sequences may be activated at random from among a selection of attract sequences. Alternatively, attract sequences may run in a periodic loop. Attract sequences may include, but are not limited to only including, a scrolling list of games that may be played on gaming machine 100, cartoons, and videos. During such times, emitter driver 306 modulates a signal to IR emitter 142 that causes IR emitter 142 to emit periodic IR light. When a player approaches or moves, such that the player is within a preset target distance of IR emitter 144, IR light emitted by IR emitter 144 is reflected from the player. The reflected IR light is sensed by IR sensor 146, which generates a current signal representative of a level of IR light sensed. The current signal is transmitted to current-to-voltage conversion unit 302. Unit 302 converts the current signal to a voltage that is proportional to the level of IR light sensed. The voltage is converted into a digital value by A/D converter 304, which transmits the digital value to controller 202. Upon determining the presence of a player within the target distance, controller 202 may activate a different attract sequence, again using video display monitor 118 and/or speakers 126, 128, and/or 130.

In the exemplary embodiment, when the player wishes to play a game using gaming machine 100, the player inserts cash into coin acceptor 110 and/or bill acceptor 112. Additionally, and/or alternatively, bill acceptor 112 may accept a printed ticket voucher that acts as an indicia of credit. Prior to initiating play, the player may access and/or enter player account information stored at gaming machine 100 and/or player server 424 using fluorescent display 138, card reader 140, and/or keypad 136, for example. Alternatively, a player may access and/or enter player account information using card reader 140 and video display monitor 118, wherein video display monitor 118 is configured for use as a touch screen. Additional player identification information may be obtained from one or more biometric input devices (not shown) such as, for example, a finger print reader, a retina scanner, and/or a camera configured for use with feature recognition software. In addition, in the exemplary embodiment, gaming machine 100 receives 704 physical characteristics of the player for use in customizing a brightness level, a contrast level, and/or a playfield size of the game to be played. Such physical characteristics may include items such as the player's age and/or data relating to the player's vision, such as their vision prescription. In one embodiment, the player's physical characteristics are stored within player server 424 after having been entered at a different gaming machine 100) or at a configuration workstation 422 as part of a registration process for the player's player account. As such, upon insertion of the player's player card, gaming machine 100 is capable of automatically querying player server 424 for the physical characteristics of the player. Player server 424 then returns the physical characteristics or returns an error message. In the case of an error message, the player may use, for example, keypad 136 to input the physical characteristics.

In the exemplary embodiment, gaming machine 100 determines 706 a level of ambient light. Specifically, visible light sensor 142 senses a level of ambient light present in the installation or current operating location of gaming machine 100. Visible light sensor 142 generates a current signal that is representative of the level of ambient light sensed. The current signal is transmitted to current-to-voltage conversion unit 302 wherein the current signal is converted to a voltage that is proportional to the level of ambient light sensed. The voltage is converted into a digital value by A/D converter 304 prior to the digital value being transmitted to controller 202.

Figure 10:
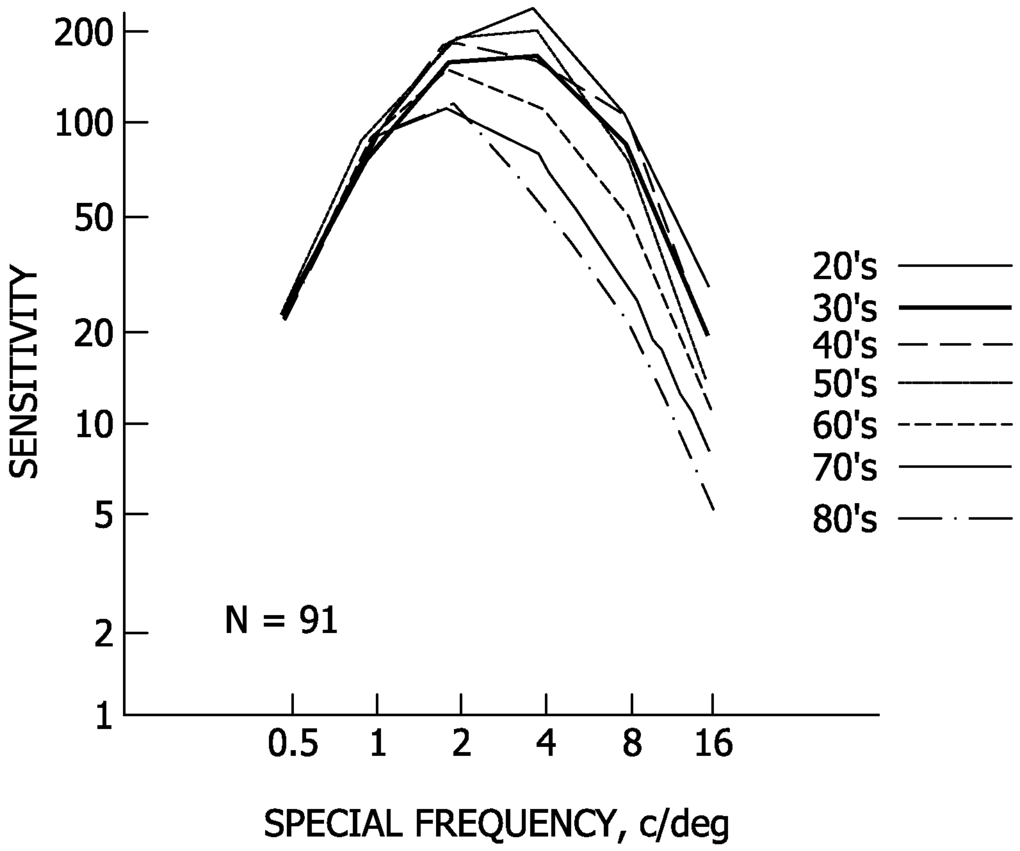
FIG. 10 is a graph of contrast sensitivity measured at different ages.

After the player characteristics have been received and the ambient light level has been determined, gaming machine 100 adjusts the graphics displayed on video display monitor 118. Specifically, gaming machine 100 determines 708 a desired brightness level based on the determined ambient light level. In one embodiment, gaming machine 100 determines the desired brightness level by mapping the determined ambient light level to a corresponding brightness level in a table stored in ROM 204 or RAM 208. In another embodiment, controller 202 calculates the desired brightness level based on the determined ambient light level. Gaming machine 100 also determines 710 a desired contrast level. In one embodiment, the desired contrast level is based on the determined ambient light level and is determined by mapping the determined ambient light level to a corresponding contrast level in a table stored in ROM 204 or RAM 208. In another embodiment, controller 202 calculates the desired contrast level based on the determined ambient light level. The desired contrast level is also at least partially based on the received player physical characteristics, such as age and vision data. More specifically, the contrast level is also at least partially based on a contrast sensitivity of the player, which is based on the received player physical characteristics. Contrast sensitivity is typically referred to as the ability of the human eye to see objects that stand out from the objects' background. As is known, contrast sensitivity generally decreases with increased age. As shown in FIG. 10, contrast sensitivity, measured in cycles per degree (CPD), peaks at different values according to a person's age. Additionally, at greater than peak frequencies, sensitivity deteriorates at a higher rate according to age. As such, a playfield size of the game being played at gaming machine 100 appears different when viewed by a 20 year old person as compared to being viewed by a 70 year old person. As shown in FIG. 10, people have relatively identical vision across age groups up to approximately 1.0 CPD.

Accordingly, in the exemplary embodiment, a desired line width is calculated 712 by controller 202 based on the graph of FIG. 10 and the following equation:

$$\frac{X}{2} = d\left(\frac{\tan\theta}{2}\right) \qquad \text{Eq. (1)}$$

wherein $$\frac{X}{2}$$

represents a minimum line width for use in displaying graphics on video display monitor 118, d is a distance to a target of focus, i.e., a distance from the player to video display monitor 118, and θ is a visual angle of approximately one minute of one degree.

In the exemplary embodiment, controller 202 uses the determined brightness level, the determined contrast level, and the calculated line width to generate 714 display settings for the game graphics to be displayed to the player using video display monitor 116. In so doing, controller 202 adjusts a playfield size of the game being played. As shown in FIGS. 6-8, playfield 602 has been re-sized such that each object being displayed is larger and, therefore, is easier for older players to see. To accommodate the re-sized playfield 602, in the exemplary embodiment, the size of first sidebar 604, second sidebar 606, and fields 608, 610, and 612 have each been decreased. Alternatively, and according to player preferences stored at gaming machine 100, on the player card inserted into card reader 138, and/or stored at player server 424, first sidebar 604 and/or second sidebar 606 may be hidden from display.

The generated display settings are then used to display 716 the game graphics to the player using video display monitor 118. Additionally, and/or alternatively, the player may use display adjustment buttons 148 to manually adjust the brightness level and/or contrast level of video display monitor 118 according to the player's preferences. If a sidebar, such as sidebar 604 or 606, has been hidden to accommodate an larger playfield 602, the player may recall the hidden sidebar 604 or 606 and may also adjust the size of playfield 602 using display adjustment buttons 148. The player may make such adjustments as desired prior to game play beginning and/or during game play.

The systems, methods, and apparatus described herein facilitate reducing player inconveniences during play on a gaming machine caused by the player's decreased focal ability, lowered contrast sensitivity, and/or ambient light levels. Adjusting the size of a game playfield facilitates enabling players with diminished vision to see the game clearly, thereby reducing eye strain and increasing the comfort of the players. Increasing the comfort of the players enables the players to play for longer periods of time. Storing and retrieving player characteristics such as age and vision data within a gaming machine or player server, for recall at a separate gaming machine at another time, facilitates increasing the convenience of such playfield adjustments by enabling a player to adjust the size, brightness, and/or contrast of playfield or display by recalling his or her characteristics. Moreover, enabling automatic adjustment of the brightness and/or contrast of the display facilitates ensuring that the game graphics are properly displayed regardless of the ambient lighting and also facilitates increasing an operation lifespan of gaming machine displays. Further, the addition of player detection facilitates enabling automatic features such as different attract sequences.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

Exemplary embodiments of systems, methods, and apparatus for controlling a gaming machine display are described above in detail. The systems, methods, and apparatus are not limited to the specific embodiments described herein but, rather, steps of the methods and/or components of the system and/or apparatus may be utilized independently and separately from other steps and/or components described herein. Further, the described steps and/or components may also be defined in, or used in combination with, other systems, methods, and/or apparatus, and are not limited to practice with only the systems, methods, and apparatus as described herein.

While the invention has been described in terms of various specific embodiments, those skilled in the art will recognize that the invention can be practiced with modification within the spirit and scope of the claims.

What is claimed is:

1. A gaming machine comprising:

a display unit configured to generate video images;

an input unit configured to accept player input;

an ambient light sensor configured to sense ambient light in an environment of said gaming machine and generate a signal representative of the sensed ambient light; and a controller coupled to said display unit, said input unit, and said ambient light sensor, said controller comprising a processor and a memory, said controller is configured to:

receive physical characteristics of a player of said gaming machine via said input unit;

determine an ambient light level of the environment of said gaming machine based on the signal generated by said ambient light sensor;

determine a desired brightness level for the video images to be displayed on said display unit based on the determined ambient light level;

determine a desired contrast level for the video images based on at least one of the received physical characteristics and the determined ambient light level;

adjust a play field size of the game being played based on the physical characteristics of the player;

generate display settings for the video images based on the determined brightness level and the determined contrast level; and display graphics to the player via said display unit using the generated display settings.

2. The gaming machine in accordance with claim 1, wherein the physical characteristics of the player received by said gaming machine include at least one of a player age and player vision data.

3. The gaming machine in accordance with claim 1 further comprising a network interface configured to communicatively couple said gaming machine to at least one server via a gaming network, wherein the physical characteristics of the player are entered at a first gaming machine, and wherein said controller is further configured to transmit the physical characteristics to the at least one server for retrieval by a second gaming machine via the gaming network.

4. The gaming machine in accordance with claim 1, wherein said controller is further configured to determine the desired brightness level and the desired contrast level by mapping the determined ambient light level to a corresponding brightness level and to a corresponding contrast level stored in said memory.

5. The gaming machine in accordance with claim 1, wherein said controller is further configured to calculate at least one of the desired brightness level and the desired contrast level based on the determined ambient light level.

6. The gaming machine in accordance with claim 1, wherein said controller is further configured to determine the desired contrast level that corresponds to a contrast sensitivity of the player, wherein the contrast sensitivity is based on the received physical characteristics of the player.

7. The gaming machine in accordance with claim 1, wherein said controller is further configured to calculate a desired line width for the video images based on the determined contrast level.

8. The gaming machine in accordance with claim 7, wherein said controller is further configured to calculate the desired line width for the video images by calculating a minimum line width based on a distance between the player and said display unit and a visual angle.

9. The gaming machine in accordance with claim 7, wherein said controller is further configured to adjust a size of a displayed game play field based at least partially on the calculated desired line width.

10. The gaming machine in accordance with claim 1, wherein said controller is further configured to adjust at least one of the brightness level of the video images, the contrast level of the video images, and a size of a displayed game play field in response to a command issued by the player via said input unit.

11. The gaming machine in accordance with claim 1, further comprising:

an infrared light emitter configured to emit infrared light; and an infrared light sensor configured to sense the infrared light emitted by said infrared light emitter and reflected by the player, wherein said controller is further configured to determine a presence of the player based on a level of infrared light sensed by said infrared light sensor.

12. A gaming system comprising:

at least one server comprising a database configured to store player data; and a plurality of gaming machines communicatively coupled to said at least one server via a gaming network, each gaming machine of said plurality of gaming machines comprising:

a display unit configured to generate video images for display to a player;

an ambient light sensor configured to sense ambient light in an environment of each said gaming machine and generate a signal representative of the sensed ambient light; and a controller coupled to said display unit and said ambient light sensor, said controller comprising a processor and a memory, said controller is configured to:

receive physical characteristics of the player of each said gaming machine;

determine an ambient light level of an environment of each said gaming machine based on the signal generated by said ambient light sensor;

determine a desired brightness level for the video images to be displayed on said display unit based on the determined ambient light level;

determine a desired contrast level for the video images based on at least one of the received physical characteristics and the determined ambient light level;

adjust a play field size of a game being played based on the physical characteristics of the player;

generate display settings for the video images based on the determined brightness level and the determined contrast level; and display graphics to the player via said display unit using the generated display settings.

13. The gaming system in accordance with claim 12, wherein each said gaming machine further comprises an input unit configured to receive the physical characteristics of the player, including at least one of a player age and player vision data.

14. The gaming system in accordance with claim 13, wherein the physical characteristics of the player are entered via said input unit of a first gaming machine of said plurality of gaming machines, and wherein said controller of each said gaming machine is further configured to transmit the physical characteristics to the at least one server for retrieval by a second gaming machine of said plurality of gaming machines via said gaming network.

15. The gaming system in accordance with claim 12, wherein said controller of each said gaming machine is further configured to determine the desired brightness level and the desired contrast level by mapping the determined ambient light level to a corresponding brightness level and to a corresponding contrast level stored in said memory of each said gaming machine.

16. The gaming system in accordance with claim 12, wherein said controller of each said gaming machine is further configured to calculate at least one of the desired brightness level and the desired contrast level based on the determined ambient light level.

17. The gaming system in accordance with claim 12, wherein said controller of each said gaming machine is further configured to determine the desired contrast level that corresponds to a contrast sensitivity of the player, wherein the contrast sensitivity is based on the received physical characteristics of the player.

18. The gaming system in accordance with claim 12, wherein said controller of each said gaming machine is further configured to calculate a desired line width for the video images based on the determined contrast level.

19. The gaming system in accordance with claim 18, wherein said controller of each said gaming machine is further configured to calculate the desired line width for the video images by calculating a minimum line width based on a distance between the player and said display unit of each said gaming machine and a visual angle.

20. The gaming system in accordance with claim 18, wherein said controller of each said gaming machine is further configured to adjust a size of a displayed game play field based at least partially on the desired calculated line width.

21. The gaming system in accordance with claim 12, wherein said controller of each said gaming machine is further configured to adjust at least one of the brightness level of the video images, the contrast level of the video images, and a size of a displayed game play field in response to a command issued by the player via said input unit of each said gaming machine.

22. The gaming system in accordance with claim 12, wherein each said gaming machine further comprises:

an infrared light emitter configured to emit infrared light; and an infrared light sensor configured to sense the infrared light emitted by said infrared light emitter and reflected by the player, wherein said controller of each said gaming machine is further configured to determine a presence of the player based on a level of infrared light sensed by said infrared light sensor.

23. A method for adjusting display settings of a gaming machine, said method comprising:

receiving physical characteristics of a player of the gaming machine;

determining an ambient light level of an environment of the gaming machine;

determining a desired brightness level for graphics to be displayed on the gaming machine based on the determined ambient light level;

determining a desired contrast level for the graphics based on at least one of the received physical characteristics and the determined ambient light level;

adjusting a play field size of game being played based on at least one of the received physical characteristics of the player;

generating display settings for the graphics based on the determined brightness level and the determined contrast level; and displaying the graphics to the player using the generated display settings.

24. The method in accordance with claim 23, wherein receiving physical characteristics of the player comprises receiving at least one of an age of the player and player vision data, as entered by the player at the gaming machine.

25. The method in accordance with claim 24, wherein receiving physical characteristics of the player comprises automatically determining the player vision data.

26. The method in accordance with claim 23, wherein the gaming machine is a first gaming machine, and wherein receiving physical characteristics of the player comprises:

receiving the physical characteristics as entered by the player at the first gaming machine;

storing the physical characteristics in a player tracking server coupled to the first gaming machine and a second gaming machine via a gaming network; and retrieving the stored physical characteristics at the second gaming machine.

27. The method in accordance with claim 23, wherein determining the desired brightness level comprises mapping the determined ambient light level to a corresponding brightness level, and wherein determining a desired contrast level comprises mapping the determined ambient light level to a corresponding contrast level.

28. The method in accordance with claim 23, wherein determining the desired contrast level comprises determining a contrast level corresponding to a contrast sensitivity of the player, wherein the contrast sensitivity is based on the received physical characteristics of the player.

29. The method in accordance with claim 23, further comprising calculating a desired line width for the graphics based on the determined contrast level.

30. The method in accordance with claim 29, wherein calculating the desired line width for the graphics comprises calculating a minimum line width based on a distance between the player and a display of the gaming machine and a visual angle.

31. The method in accordance with claim 29, wherein displaying the graphics to the player comprises adjusting a size of a displayed game play field based at least partially on the calculated desired line width.

32. The method in accordance with claim 23, wherein displaying the graphics to the player comprises adjusting at least one of the brightness level of the displayed graphics, the contrast level of the displayed graphics, and a size of a displayed game play field in response to a command issued by the player via an interface of the gaming machine.

33. The method in accordance with claim 23 further comprising determining a presence of the player using an infrared light emitter configured to emit infrared light and an infrared light sensor configured to sense the infrared light emitted by the infrared light emitter and reflected by the player, wherein the controller is further configured to determine the presence of the player based on a level of infrared light sensed by the infrared light sensor.

* * * * *